United States Patent [19]
O'Connor et al.

[11] Patent Number: 5,295,530
[45] Date of Patent: Mar. 22, 1994

[54] SINGLE-CAST, HIGH-TEMPERATURE, THIN WALL STRUCTURES AND METHODS OF MAKING THE SAME

[75] Inventors: Kurt F. O'Connor, Carmel; James P. Hoff, Greenfield; Donald J. Frasier, Greenwood; Ralph E. Peeler, Reelsville; Heidi Mueller-Largent, Indianapolis; Floyd F. Trees, Bloomington; James R. Whetstone, Indianapolis; John H. Lane, Indianapolis; Ralph E. Jeffries, Indianapolis, all of Ind.

[73] Assignee: General Motors Corporation, Detroit, Mich.

[21] Appl. No.: 838,154

[22] Filed: Feb. 18, 1992

[51] Int. Cl.5 .................. B22C 9/00; B22C 9/04; B22D 39/06
[52] U.S. Cl. .................. 164/516; 164/133; 164/34; 164/137
[58] Field of Search .......... 164/9, 10, 11, 34, 35, 164/108, 122.1, 122.2, 137, 397, 368, 361, 370, 516, 133

[56] References Cited

U.S. PATENT DOCUMENTS

| 3,659,645 | 5/1972 | Rose | 164/366 |
| 4,077,458 | 3/1978 | Hayashi | 164/9 |
| 4,421,153 | 12/1983 | Wilkinson | 164/516 |
| 4,552,198 | 11/1985 | Mills | 164/122.2 |
| 4,617,977 | 10/1986 | Mills | 164/361 |
| 4,811,778 | 3/1989 | Allen | 164/397 |
| 4,986,333 | 1/1991 | Gartland | 164/137 |
| 5,234,045 | 8/1993 | Cisko | 164/97 |

FOREIGN PATENT DOCUMENTS

| 51-24976 | 6/1976 | Japan | 164/10 |
| 60-177946 | 9/1985 | Japan | 164/9 |

Primary Examiner—Paula Bradley
Assistant Examiner—Rex E. Pelto
Attorney, Agent, or Firm—Cary W. Brooks

[57] ABSTRACT

Disclosed is a single-cast, thin wall structure capable of withstanding impinging gases at temperatures of 4300° F. and higher, and method of making the same. Using a bleed line of the instant invention allows for a decreasing metal pressure with respect to time which prevents any damage to the thin outer mold wall.

30 Claims, 6 Drawing Sheets

SINGLE-CAST, HIGH-TEMPERATURE, THIN WALL STRUCTURES AND METHODS OF MAKING THE SAME

FIELD OF THE INVENTION

This invention relates to single-cast, high-temperature, thin wall structures and methods of making the same, and more particularly to thin wall hollow structures capable of withstanding impinging gases at high temperatures.

BACKGROUND

Thick walled one-piece alloy structures are disclosed in U.S. Pat. Nos. 3,806,276 and 3,192,578. Laminated structures having thin walls capable of withstanding of high temperature impinging gases have heretofore been known. By way of example, such structures are disclosed in U.S. Pat. Nos. 4,245,769; 4,042,162; 4,004,056; 3,963,368; 3,950,114; 3,933,442; 3,810,711; 3,732,031; 3,726,604; 3,698,834; 3,700,418; 3,644,059; 3,644,060; 3,619,082; 3,616,125; 3,610,769; 3,606,572; 3,606,572; 3,606,573; 3,584,972; 3,527,544; 3,529,905 and 3,497,277. The thin walls of such structures are laminated to another thin wall or to a substantially thicker structure by brazing, welding or otherwise bonding. The laminating process involves high temperature brazing, welding or bonding materials that directly affect the alloy or otherwise limit the overall high temperature performance of the structure. Further, these thin wall layers often have holes formed therein by mechanical means or etching which is time consuming, labor intensive and expensive. Although these laminated thin wall structures are capable of withstanding impinging gases at temperatures higher than the melting point of the alloys which the structures are made from, the process of making the structures is time consuming, labor intensive and extremely expensive.

Many prior art methods of casting hollow structures utilize ceramic cores. It has been generally accepted that these core must have a density sufficiently low enough such that the core is compressive so that it gives as molten alloy solidifies around the core. It has generally been accepted that if the core has a density above 60 to 70 percent, the core will be crushed and broken by molten alloy which solidifies around it. It has also generally been accepted that cores having a thickness less than 0.03 inches with such low density less would be crushed and broken during casting. The density of prior art ceramic cores ranges from about 50 to about 60 percent.

Although 100 percent quartz rods having 100 percent density have been used, such use has been limited to making bent and straight holes or central passageways. Heretofore, a high density ceramic core (above 70 to 99 percent plus density) has not been used to make a radial passageway. Generally, in turbine engine components such as turbine blades, such radial passageways parallel the outer thin wall of the component or turbine blade.

It is generally accepted that the use of a high density material for a large core will break the metal. As molten alloy solidifies around a large high density core, the metal shrinks faster than the core and will break due to the high density core. Thus, those skilled in the art use low density cores to compensate for the fast rate of shrink of the molten metal and to prevent the metal from breaking.

Another problem recognized by those skilled in the art is the problem of shape distortion during casting. Heretofore, it has been generally accepted that this shape distortion of the casted part is caused by what is knows as "mold buckle". This "mold buckle" occurs in the process of building up the shell around the core and pattern. If one of the successive shell layers does not sufficiently dry, the layer moves away from the pattern causing the mold to "buckle" and causes a distorted casting shape. Heretofore, it was not recognized that casting shape distortion could be caused by shell creep.

In prior art methods of making laminated thin wall structures such as gas turbine blades, the thin walls are provided by metal which has been cold rolled to a very thin thickness. The cold-rolled metal is then etched or machined to provide small holes in the surface thereof. The small holes provide a cooling air film over the thin wall as the gas turbine blade is impinged with hot gases. This cold-rolled metal must be formed and bonded (or welded sufficiently to provide heat transfer from the thin wall to the main body of the blade) in a curved shape to produce the outer wall of a turbine blade. The forming process may result in the distortion of the holes in the wall. If the holes are not properly positioned, or the metal not sufficiently bonded, it is possible to develop hot spots at certain sections on the blade which would be undesirable and would limit production yields. Further, the cold-rolled material must be later heat treated which also could possibly result in varying heat transfer properties across the surface of the blade which also would be undesirable.

Other casting problems are caused by ceramic cores which are extremely brittle and fragile. These problems increase with decreasing thickness and density.

Heretofore, there has been a need for single-cast, high-temperature, thin wall hollow structures and means for making the same which is quick, relatively inexpensive and not labor intensive. A means for satisfying this need has heretofore escaped those skilled in the art.

SUMMARY OF THE INVENTION

The present invention includes the discovery of a variety of phenomena and agencies which gave rise to an idea of a means for repeatably and reliably producing or casting thin wall hollow structures with dimensional accuracy and having the thickness less than about 0.03 inches. The following statements, by way of example, highlight the discoveries which are part of the present invention as a whole.

The invention includes the discovery that the problem of creep of a ceramic shell can be solved by controlling the injection pressure of the molten alloy into a cavity. The injection pressure may be controlled as a function of time to cast walls having a thickness less than about 0.03 inches without shell creep.

The invention includes the discovery that the injection pressure of an alloy into a cavity can be varied as a function of time by using a control orifice to bleed the head pressure off after the thin cavity has been filled.

The invention includes the discovery that very thin passageways of about 0.005 to 0.015 inches can be formed using a thin core having a density greater than about 70 percent, and preferably about 99 percent or greater.

The invention includes the discovery that a thin core having a thickness of about 0.005 to 0.015 inches and a density greater than about 70 percent will not be crushed and broken when surrounded by solidifying alloy.

The invention includes the discovery that such thin cores can be used to form narrow radial passageways, having a width of about 0.005 to about 0.015 inches, in casting and such passageway can be formed substantially parallel to a thin outer wall having a thickness of about 0.005 to about 0.03 inches.

The invention includes the discovery that cores having a thickness of 0.005 to 0.015 inches can be used in core making, pattern making and casting process without reducing yields.

The invention includes the discovery that a structure can be cast using high density ceramic cores, preferably quartz, having a minimum dimensions of about 0.005 to about 0.55 inches to form very small holes in a thin wall structure and to hold the above-described thin core in place during casting. These cores can be of any shape.

The invention includes the discovery that a pocket can be drilled into a ceramic core so as to receive and hold such as a narrow diameter rod.

The invention includes the discovery that a single-piece, hollow multi-wall structure having a very thin outer wall, an inner wall and a very thin passageway therebetween can be cast using a ceramic core, narrow rod and thin ceramic core construction.

The invention includes the discovery that a very thin curved core can be held in position in a casting mold by forming a first ceramic core; coating the first ceramic core with wax or plastic pattern where metal is desired; placing the very thin curved ceramic core on the pattern; drilling a hole through the very thin ceramic core, pattern and into the first ceramic core to form a pocket; inserting a rod through the hole so that the rod is received in the pocket in the first ceramic core; covering the very thin ceramic core with a thin layer of wax or plastic pattern where a thin wall of metal is desired; forming a hole through the thin layer of wax and into the thin ceramic core so as to form an angled pocket in the first core at a predetermined position where force is needed to keep the thin ceramic core in its curved shape; inserting a portion of an outer rod through the hole in the thin layer of wax so as to be received in a pocket from in the main ceramic core or in the thin core so that upon casting the structure a passage is provided through the thin wall and into the cavity formed by the thin core or extending through to the cavity formed by the main core; and covering the thin layer of wax and the other portion of the outer rod with a ceramic shell.

The invention includes the discovery that defects in the walls of a casting, made using a ceramic shell, can be avoided by sandblasting the above-described thin layer of wax on the face closest to the ceramic shell.

The invention includes the discovery of a means for producing single-cast, thin wall structures having smooth outer surfaces and having wall thicknesses as narrow as about 0.005 inches.

The invention includes the discovery of a single-cast, thin wall hollow structure capable of withstanding impinging gases at temperatures as high as 4300° F. or higher.

Another advantage of the present invention is that finer details can be made in the thin ceramic core using a laser due to the high density of the core.

The present invention can be utilized to make structures having multiple thin walls each having a thickness less than about 0.03 inches as illustrated in FIG. 8.

The present invention has a lighter weight, higher temperature capabilities and greater strength then the laminated thin wall structures of the prior art and is greatly more economical to produce.

It is possible using the techniques of the present invention to make multi-wall structures having more than 20 thin walls each having a thickness less than 0.03 inches.

These and other discoveries, objects, features and advantages of the present invention will be apparent from the following brief description of the drawings, detailed description and appended drawings and claims.

DETAILED DESCRIPTION

Figure 7:
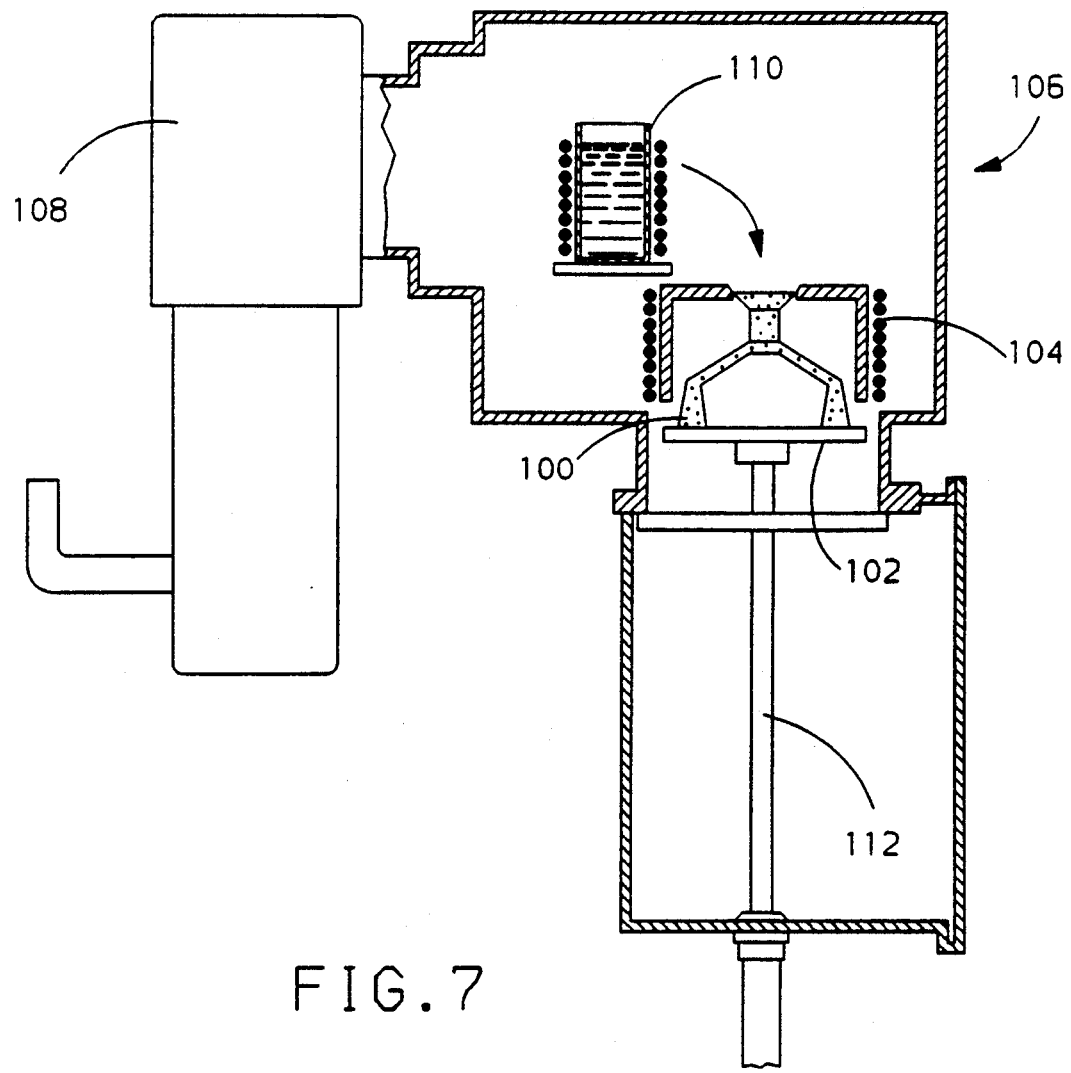
FIG. 7 is an illustration of a method of forming single crystal alloy structures.

The techniques of the present invention may be used to produce thin walled hollow structures using equiaxed, directionally solidified and single crystal alloy processes. A variety of techniques are known for producing equiaxed, directionally solidified and single crystal alloy structures. The present invention is particularly suitable for producing very thin walled structures using single crystal casting techniques. One such single crystal casting technique is illustrated in FIG. 7, which shows a casting mold 100 carried on a water cooled chill plate 102 and received in a mold heater 104. A casting furnace 106 includes a vacuum system 108 and an induction melting crucible 110 for pouring molten alloy in the mold 100. Once the molten alloy is poured in the mold, the mold is slowly removed from the furnace by an elevator 112.

Generally, for single crystal processing, the molding temperature is preferably heated to at least 2800° and the single crystal superalloy is heated to 2800° F. and the single crystal is grown slowly at about 10 inches/hr. Generally, for equiaxed processes, the mold temperature is heated to about 1800° F. and the equiaxed alloy temperature is heated to 2800° F. and the alloy solidified at 1 mm/min.

Various types of superalloy compositions and manufacturers of such compositions are known to those skilled in the art. Most alloys of interest are complicated mixtures of nickel, chromium, aluminum and other elements.

Prior attempts to cast multi-wall structures having at least one wall less than 0.03 inches thick have been foiled by what has been known as "shell creep." In order to get molten alloy to completely fill narrow passages less than 0.03 inches thick, a substantial amount of head pressure is necessary. However, the ceramic shell used in such casting processes is not sufficiently strong enough to withstand the head pressure needed to fill these narrow passages. As a result, the head pressure causes the walls of the shell to creep outwardly thus distorting the mold and rendering the part unacceptable. This problem is particularly troublesome when casting at high temperature with slow solidification such as single crystal investment casting.

Figure 1:
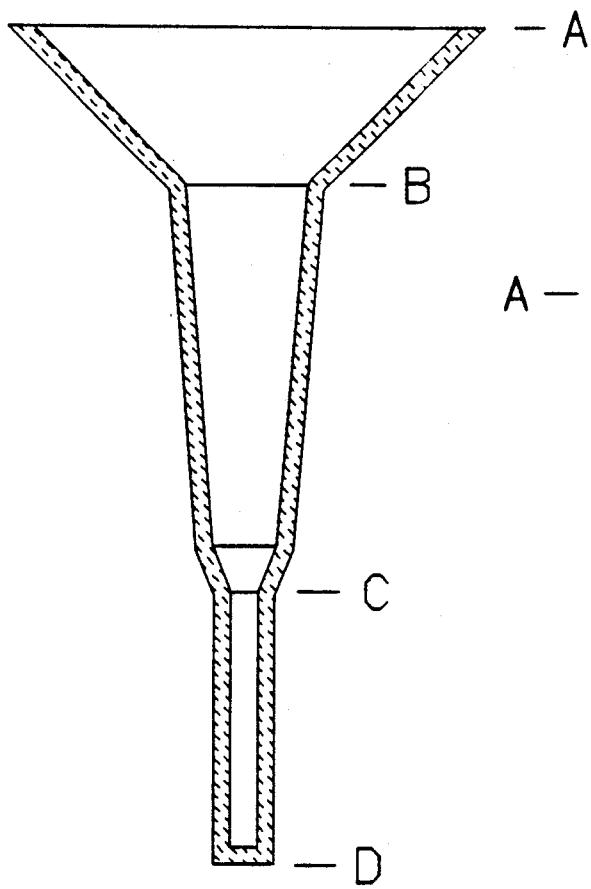
FIG. 1 is a sectional view of a prior art casting mold.
Figure 2:
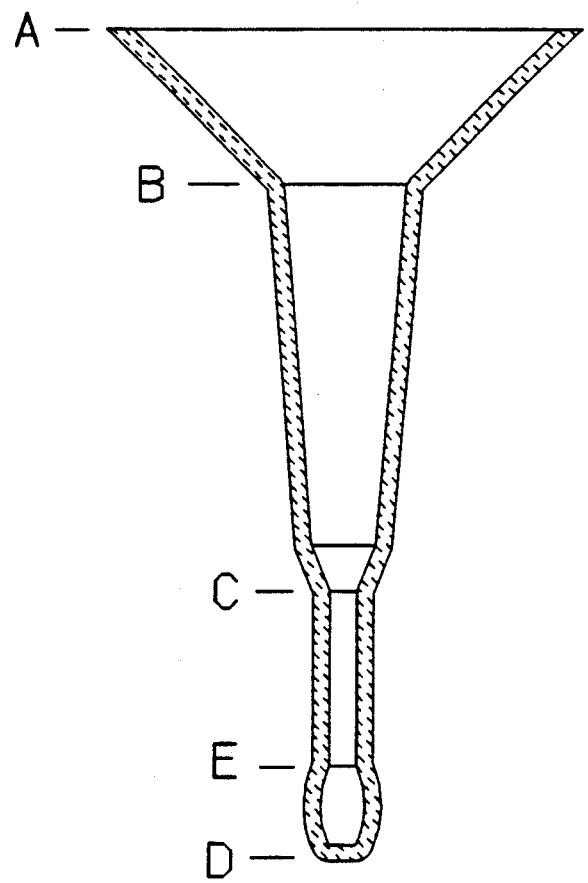
FIG. 2 is a sectional view of a prior art casting mold after the mold has creeped.

FIG. 1 illustrates a cross-sectional view of a standard mold before injecting molten alloy under pressure. The portion of FIG. 1 from points A-B represent the alloy charge reservoir, points B-C a charge runner, and points C-D the actual shape of the part to be cast. FIG. 2 illustrates a cross-sectional view of the distortion of the mold due to sustained pouring or injecting head pressure of the molten alloy. As can be appreciated from FIG. 2, maintaining the head pressure during injection of the molten alloy, causes the wall to become substantially thicker than desired. Points D-E illustrate the distortion of the casting shell due to "shell creep" under substantial head pressure. The "shell creep" phenomenon precludes the casting of a structure with dimensional accuracy using prior processes.

Figure 3:
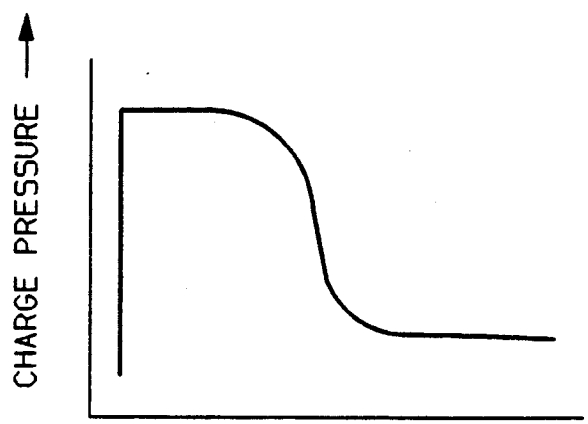
FIG. 3 is a graphic illustration of the process of varying charge pressure with time of the present invention.

The present invention includes the discovery that the problem of "creep" of a ceramic shell can be solved by varying the injection pressure of a molten alloy into a cavity, having a thickness less than about 0.03 inches, as a function of time. This concept is graphically illustrated in FIG. 3. One means of accomplishing this is illustrated in FIG. 4.

Figure 4:
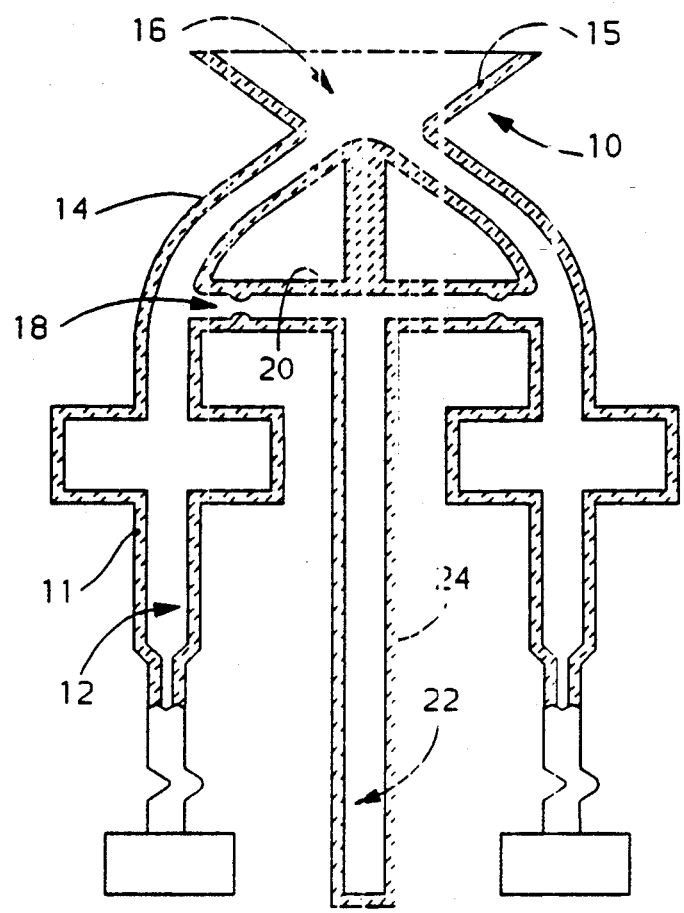
FIG. 4 is an illustration of a casting mold of the present invention.

FIG. 4 illustrates a ceramic shell 10 having a part mold 11 having a cavity 12 for producing a structure with a wall having a thickness less than about 0.03 inches. Molten alloy is injected into the cavity and allowed to solidify to form a desired structure. An alloy charge line 14 is located above the area of the mold cavity designated for the desired structure. Molten alloy is delivered from a reservoir 16 defined by container 15 through the molten alloy charge line 14 to the structure cavity of the mold. A charge pressure control means may be a control orifice 18 that is located above the structure cavity of the mold and connected to the alloy charge line. The charge pressure control means may be a bleed line 20 to remove excess alloy once the cavity has been filled and to reduce the head pressure of the molten alloy thus eliminating the undesirable "creep" of the ceramic shell. The bleed line 20 communicates with an excess alloy reservoir 22. Preferably the excess alloy reservoir 22 is located immediately below the alloy reservoir 16 and is defined by a hollow column 24 which supports container 15. A plurality of port molds 11 may be positioned radially around the column 24 with associated charge lines 14 and bleed lines 20 as described above. The typical range of head pressure for casting a wall having a thickness of less than 0.03 inches ranges from about 10 inches to about 14 inches of a nickel-based superalloy having a density of about 0.3 lbs./in.$^3$. The technique may be used to fill cavities less than 0.03 inches thick, and up to 5 feet high and 2 feet wide.

The invention includes the discovery that very thin passageways of about 0.005 to about 0.015 inches wide, can be formed using a thin core having a density greater than about 70 percent, and preferably about or greater than 99 percent. The present invention uses thin cores having a thickness less than about 0.005 to about 0.020 inches and having a density greater than about 99 percent. These cores may be made out of a ceramic material or a plastic material. It has been discovered that the high density of such thin cores gives the thin core sufficient strength to withstand core, wax pattern, mold and casting processes. A suitable material for use in such thin cores is a silica ($SiO_2$) material, commonly called quartz. The surface of the core may be patterned to provide pedestals or indentations by machining or preferably by laser patterning. The very thin ceramic core having a thickness less than about 0.03 inches may be shaped before or after making holes in it by, for example, a process of "creep" forming over a contoured die.

Figure 6:
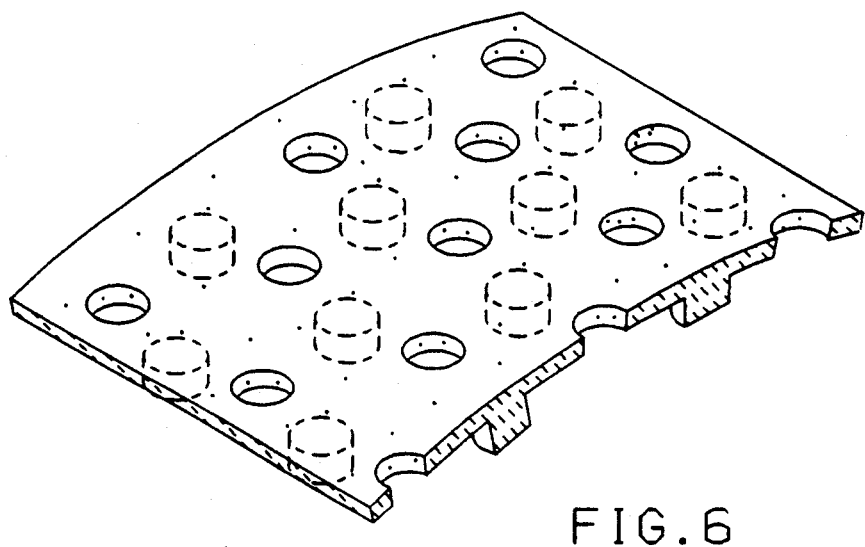
FIG. 6 is an illustration of a thin ceramic core of the present invention.

The very thin ceramic core can be made from a variety of materials capable of withstanding the alloy casting temperatures and which can be easily removed with a strong acid or base or can be burned out ash free. A preferred material for the very thin ceramic core is quartz. FIG. 6 illustrates a suitable thin ceramic core having a pattern formed by a laser on the surface thereof. The pattern forms channels and pedestals in the cast part to increase surface area for heat exchange.

The invention includes the discovery that a thin wall structure can be cast using rods having a diameter of about 0.09 to about 0.55 inches to form very small holes in a thin wall structure and to hold the above-described thin core in place during casting. The holes may be formed by a variety of shaped structures in addition to rods depending on the desired objectives. In the present invention, holes in the thin wall may be formed with precision using rods which are placed in a predetermined position so that when the wall structure is cast, the holes would be perfectly positioned on the surface of the thin wall. The use of such rods are particularly advantageous when a curved surface having holes therein is desired. Machining holes on a curved surface of a thin wall is very difficult, time consuming and expensive. In the present invention rods are used to cast the structure with very narrow holes thus eliminating machining. However, in order to do so the rods must be received in a pocket formed in the core. The pocket may be formed in the core during the core molding process or may be subsequently formed in the molded core by a variety of means such as drilling or directing a laser beam on the core.

Figure 5:
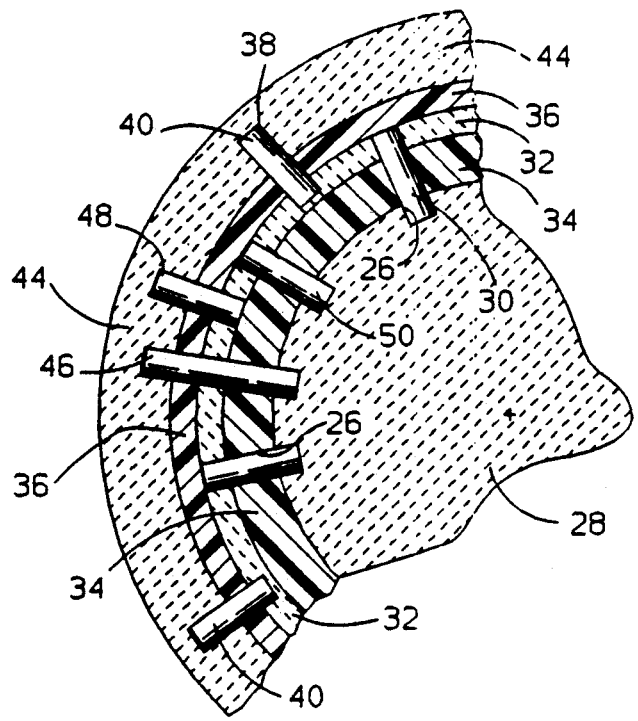
FIG. 5 is an illustration of a casting mold, pattern, core and rod combination of the present invention.

The invention includes the discovery that in one embodiment a pocket 26 can be drilled into a ceramic core 28 so as to receive and hold the above-described narrow diameter rod 30 in the ceramic core if the core to be drilled is free of the normal protective coating used in the art. The present invention includes a process which avoids using a protective coating on the ceramic core. As illustrated in FIG. 5, the ceramic core 28 free of protective coating is drilled to provide a pocket 26 for receiving and holding a narrow diameter rod 30 in the ceramic core to provide passageways from the void formed by the main core 28 to the thin void formed by the thin ceramic core 32 and to hold the thin ceramic core 32 in fixed relationship between the casting shell 32 and the main core 28. The pocket is made sufficiently large enough to receive the rod yet small enough to firmly hold it in place and withstand any thermal expansion of the rod or ceramic core during the casting process. Generally a clearance ranging from about 0.0005 to about 0.001 inches greater than the diameter of the rod is sufficient. The rod may be made out of quartz, $Al_2O_3$ or other similar material.

The present invention includes a method for holding the very thin, curved core 32 in position in the casting process. According to the present invention, a first ceramic core 32 is prepared and coated with a first pattern 34 of wax or plastic where metal is desired. Then a curved, very thin core 32 is placed on the first pattern 34 and initially located with locating pins (not shown). The locating pins are positioned near the corners of the thin core and extend into the pattern so as to temporarily hold the thin core in position while the subsequently described hole making process takes place. A hole is drilled through the very thin ceramic core 32, pattern 34 and into the first ceramic core 28 to form a pocket 26 in the first core 28 for receiving and holding in place a small diameter rod 30. A small diameter rod 30 is inserted through the hole so that the rod is received in the pocket formed in the first ceramic core. The very thin ceramic core is then covered with a thin pattern 36 of wax or plastic (or other suitable material) where a thin wall of metal is desired. Then holes are formed at an angle through the thin pattern 36 and into the thin ceramic core to form a pocket 38 at a predetermined position where force is needed to keep the thin ceramic core in its curved shape. Although the thin ceramic core may be already curved, the core has a resiliency or elasticity that cause it to want to move out of a curved shape such as that needed to make a gas-turbine blade. An outer rod 40 is inserted through the hole in the thin pattern 36 so as to be received in the pocket 38 of the thin ceramic core. Finally, the thin pattern 36 and the other portion of the outer rod 42 are covered with a ceramic shell 44.

The thin core may also be held in position by a geometric relationship of the core and holding rods. A rod may extend through a thin curved core so that the longitudinal axis of the rod is at an angle of ninety degrees or greater to a line tangential to the curved core surface at a point near the longitudinal axis of the rod. This arrangement prevents the core from moving.

A substantially straight air passageway may be formed by placing a rod 46 which extend through the thin pattern 36, thin core 32, first pattern 34 and is carried on one end by the casting shell 44 and by the main core 28 on the other end. A labyrinth for air flow may be formed by a first rod 48 held on one end by the casting shell 44 and extend through the thin pattern 36 and the thin core 32. A second rod 50 is positioned a distance laterally from the first rod 48, is held on one end by the main core 28 and extends through the first pattern 34 and the thin core 32. So that when the part is cast and the rods and cores are removed, air may flow from the outer surface of the part perpendicularly through the hole formed by rod 48 in the thin wall associated with the thin pattern 36, parallel to the thin wall through the passageway formed by the thin core 32 and perpendicular through the hole formed by rod 50 in the wall associated with the first pattern 34 out to the void left by the main core 28. This type of labyrinth provides enhanced air contact with the thin wall associated with the thin pattern 36 and provide enhanced cooling of the thin wall such that the wall, in combination with other features described herein, can withstand impinging gases at temperatures of 4300° F. and greater. Thereafter the patterns are removed. In the case of wax patterns, the entire mold is preheated to cause the wax to flow out of the mold leaving a cavity for molten alloy and so that the cores are held firmly in place. The alloy is then cast in the mold as described above and the pins and cores are removed, for example, with a caustic solution.

The present invention includes the discovery that defects in the wall of a casting made using a ceramic shell can be avoided by reducing the surface tension of the above-described thin layer of wax or plastic on the face closest to the ceramic shell. One way to reduce the surface tension of the wax or plastic pattern is to sandblast the pattern's outer surface.

Once the above-described thin layer of wax has been coated over the thin ceramic core, the thin layer of wax and other portions of the outer rod are covered with a ceramic shell. The ceramic shell covering is made by first dipping the thin layer of wax in a slurry having ceramic particles in a colloidal silica vehicle. A suitable ceramic powder may have a mesh size of about 325. The mold is then dipped into dry ceramic refractory powder to give strength to the shell. The process of dipping the mold into a ceramic slurry followed by dry ceramic refractory powder is repeated until a sufficient thickness of the shell is achieved, for example, a thickness of about ½ inch. The ceramic slurry and dry powder are dried in an oven at a temperature of about 72°–78° F., at 10 percent to 30 percent relative humidity during each dipping step.

In its dried state, the shell may produce dust particles having a size ranging from about 1/1000 to about 3/1000 inch. It has been discovered that when the mold is heated the wax expands upon heating to accumulate ceramic dust particles which individually have a size ranging from about 1/1000 to about 3/1000 inch in sufficient amounts so as to produce in the cast structure surfaces defects having a size of 20/1000 inch or greater. It has also been discovered that this problem can be eliminated by altering the surface tension of the wax or plastic prior to coating with the ceramic shell. Particularly suitable sandblasting material is 120 grit $Al_2O_3$ used at a pressure ranging from about 5 to about 10 psi.

Figure 8:
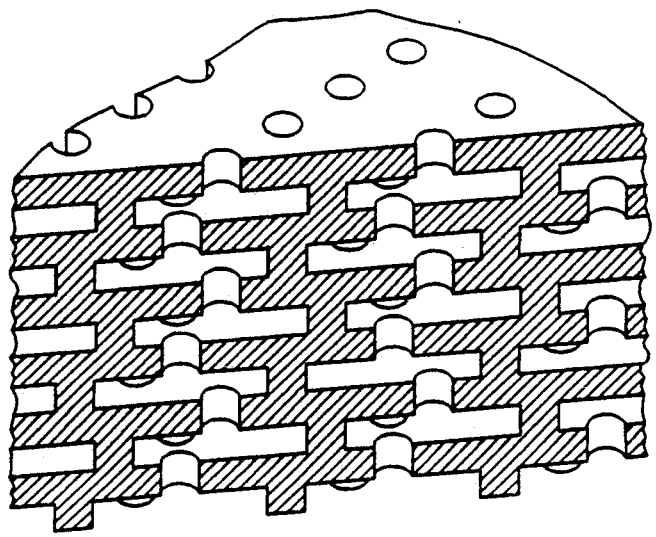
FIG. 8 is an illustration of a multi-wall structure of the present invention.
Figure 9:
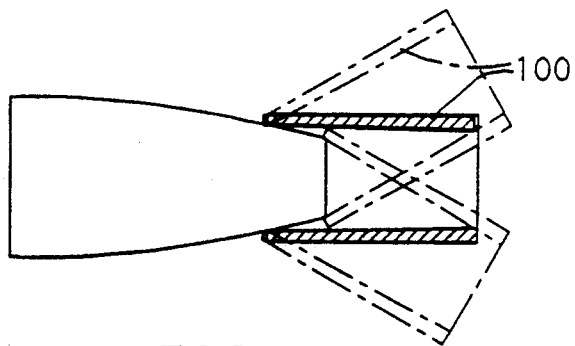
FIG. 9 is an illustration of a jet engine having nozzles made according to the present invention.
Figure 10:
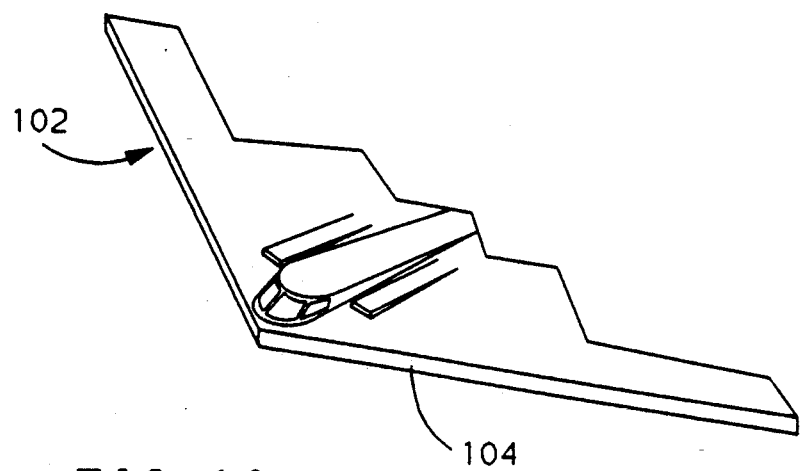
FIG. 10 is an illustration of an atmospheric air/space craft having a leading edge made from a material according to the present invention.
Figure 11:
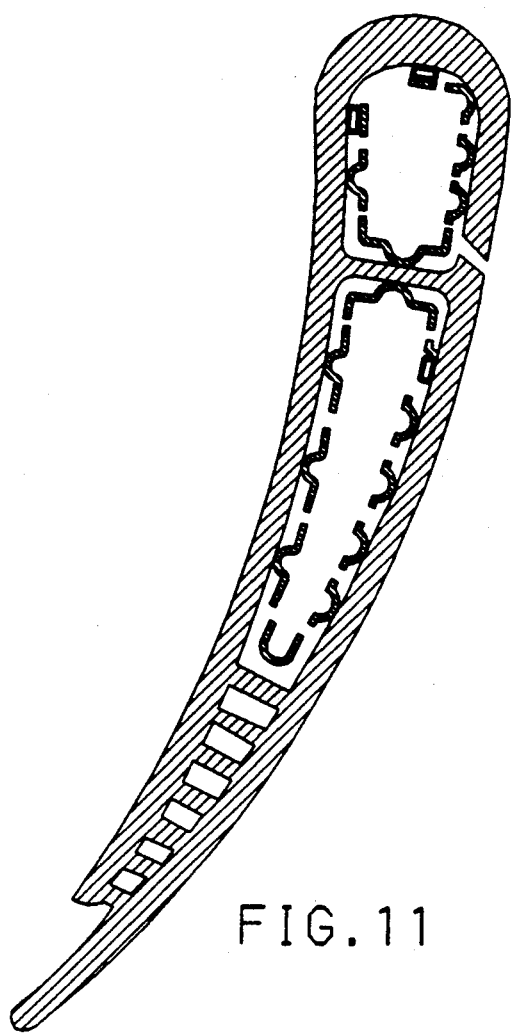
FIG. 11 is a cross-section of a prior art film cool turbine-blade.
Figure 12:
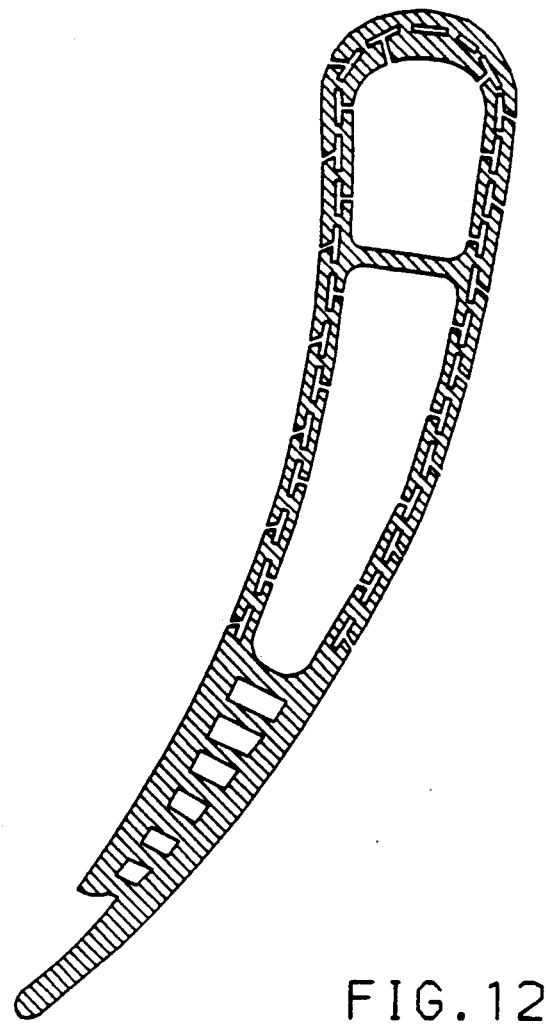
FIG. 12 is a cross-section of a single piece, single cast turbine-blade having a thin outer wall according to the present invention.
Figure 13:
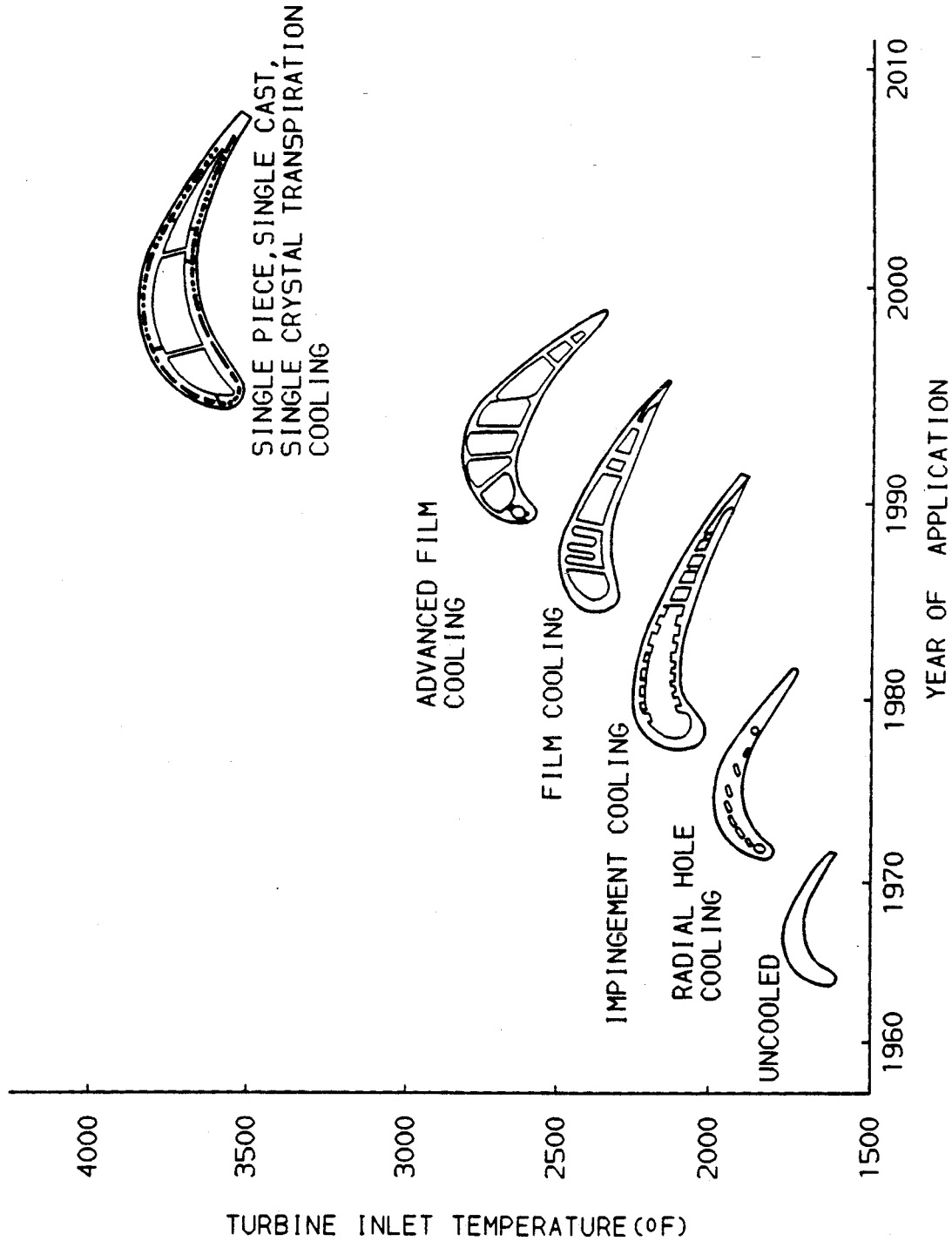
FIG. 13 is an graphic illustration of various turbine-blade designs developed over time verse practical operating turbine inlet temperatures (° F) for gas turbine engines using the various turbine-blade designs.

Using the above-described techniques, it is possible to produce a single-cast, thin wall structure having smooth outer surfaces and a wall thickness as narrow as about 0.005 inches. FIG. 8, illustrates a single piece, thin walled, gas-turbine blade according to the present invention with portions removed. FIG. 9 is a sectional view of a single piece, multi-wall structure according to the present invention. This single-cast, thin wall structure is capable of withstanding impinging gases at temperatures as high as 4300° F. The techniques of the present invention can be utilize to produce a variety of products which will be readily apparent from those skilled in the art including gas turbine blades such as jet engine nozzles 100 (illustrated in FIG. 9), leading edge 104 of wings and similar structures for above atmosphere air/space craft 102 (illustrated in FIG. 10).

According to the present invention, a variety of thin walled hollow structure may be cast having equiaxed, single crystal and directional solidified structures. For equiaxed structures the very thin wall may have a thickness ranging from about 10/1000 to about 40/1000 inches and preferably about 10/1000 to about 15/1000 inches. For single crystal and directional solidified structures the very thin wall may have a thickness of about 3/1000 to about 40/1000 inches, preferably 3/1000–20/1000 inches, and most preferably about 3/1000 to about 10/1000 inches. Thin walled hollow structure having such thickness can be cast with dimensional accuracy using the processes of the present invention.

When the invention or an element of the invention is defined in terms of ranges or proportions, such is intended to convey the invention as including the entire range, or any sub-range or multiple sub-ranges within the broader range. For example, when an element of the invention is described as containing about 5 to about 95 weight percent of component A, such is intended to convey the invention as also including from about 5 to about 40 weight percent A, from about 20 to about 30 weight percent A, and from about 90 to about 95 weight percent A. For example, the expression $A_{5-90}B_{20-70}$ is intended to convey the invention as including the composition of $A_{5-20}B_{20-40}$, $A_{85-90}B_{20-25}$ and $A_{43}B_{57}$. For example, the expression "having a thickness ranging from about 3/1000 to about 40/1000 inches" is intended to convey the invention as including a thickness ranging from about 3/1000–5/1000 inches, and from about 5/1000–15/1000 inches.

The embodiments of the invention in which an exclusive property or privilege is claimed are defined as follows:

1. A process of casting a molten alloy into a mold cavity having a thickness of less than about 0.03 inches, defined at least partially by a ceramic shell, so that said shell is not substantially distorted and said mold cavity is not substantially expanded during the casting step comprising;
    charging molten alloy into a mold reservoir which communicates with a charge line and a mold cavity defined by a ceramic shell and having a thickness less than about 0.03 inches, wherein the amount of molten alloy charged into the reservoir is sufficient for the molten alloy to flow by gravity from the reservoir through the charge line and to completely fill the mold cavity having a thickness less than about 0.03 inches;
    bleeding off molten alloy at a location above the mold cavity having a thickness less than about 0.03 inches so that the alloy pressure in the mold cavity is decreased over time and so that the ceramic shell is not substantially distorted and the mold cavity is not substantially expanded during the casting process; and
    solidifying the molten alloy to produce a solid metal part having a portion with a thickness less than about 0.03 inches corresponding to the mold cavity.

2. A method as set forth in claim 1 further comprising the step of providing a mold apparatus including a molten alloy reservoir, a molten alloy charge line communicating with the reservoir and said mold cavity, and a bleed line communicating with said charge line and positioned to decrease the alloy charge pressure to the mold cavity over time so that the entire cavity is filled with molten alloy and the mold cavity does not expand during the casting process.

3. A method as set forth in claim 2 wherein said bleed line includes a restricted control orifice.

4. A method as set forth in claim 3 wherein said bleed line and restricted control orifice are above the mold cavity having a thickness of less than about 0.03 inches.

5. A method as set forth in claim 1 wherein the mold cavity is constructed an arranged to define a thin wall of a jet engine turbine blade.

6. A method of making a multi-wall alloy structure comprising:
    providing a main core corresponding to a void in said structure;
    providing a first removable pattern material covering said main core corresponding to a first wall of said structure;
    providing a thin core having a density greater than 70 percent in fixed relationship to said main core so as to correspond to a thin passageway in said structure;
    providing a second removable pattern material covering said thin core so as to correspond to a thin wall in said structure having a thickness of less than 0.03 inches;
    surrounding said second removable pattern with a casting mold so as to define the outer surface of said thin wall;
    removing said patterns to leave said cores in fixed relationship with each other and said casting mold;
    charging said casting mold with molten alloy and varying the charge pressure with time so that said thin wall is formed without causing said casting mold to creep;
    solidifying said molten alloy and removing said casting mold and said cores to provide said multi-wall alloy structure.

7. A method as set forth in claim 6 wherein said step of solidifying is carried out so as to produce an alloy structure having a single crystal structure throughout.

8. A method as set forth in claim 6 wherein said thin core is held in a fixed position with said main core and said casting mold by thin rods having a diameter ranging from about 0.009 to about 0.55 inches.

9. A method as set forth in claim 8 wherein at least one of said rods extend through said thin core and has one end received in a pocket formed in said main core.

10. A method as set forth in claim 6 wherein the said thin core has a thickness ranging from about 0.005 to 0.03 inches.

11. A method as set forth in claim 6 wherein said thin core has a density of at least 99 percent.

12. A method as set forth in claim 10 wherein said thin core is radial in shape.

13. A method as set forth in claim 6 further comprising the step of laser patterning pedestals and indentations into said thin core.

14. A method as set forth in claim 11 further comprising laser patterning indentations and pedestals into said thin core.

15. A method as set forth in claim 6 further comprising forming a hole through the second pattern and a hole at least into the thin core, inserting a rod having a diameter ranging from 0.009 to 0.55 inches through the hole in second pattern and into the thin core, so that said rod forms a hole through the thin wall of the solidified alloy corresponding to the second pattern.

16. A method as set forth in claim 15 wherein said second pattern has a portion with a curved shape and said rod and second pattern hole are located in the curved portion.

17. A method as set forth in claim 6 wherein said second removable pattern comprises wax, and further comprising the step of said blasting the outer surface of the wax pattern prior to surrounding the second pattern with a casting mold.

18. A method as set forth in claim 6 wherein said main core is resin free.

19. A process as set forth in claim 1 wherein said mold cavity has a thickness ranging from about 0.005 to 0.012 inches.

20. A method as set forth in claim 10 wherein said thin core is contoured.

21. A method as set forth in claim 13 wherein said thin core has a thickness ranging from about 0.008 inches to about 0.012 inches.

22. A method comprising:
providing a main ceramic core;
covering said main ceramic core with a first pattern where an alloy is to be cast;
placing a very thin core on said pattern, said thin core having a thickness less than about 0.02 inches and a density greater than about 70 percent, and said thin core positioned to have a curved shape;
providing a hole through said curved thin core, first pattern and into said main core to form a pocket in said main core to receive a portion of a first narrow rod;
inserting a portion of a rod through said thin core so that the longitudinal axis of said rod and the outer surface of said thin core away from said main core are at substantially right angles, through said first pattern and so that a portion of said rod is firmly received in said pocket formed of said main core;
covering said thin core with a second pattern where an alloy is to be cast;
providing a hole through said second pattern and into said thin core but not extending therethrough to provide an angled pocket in said thin core for receiving a second rod at a predetermined position where force is needed to keep said thin core in a position such that said thin core has a curved shape;
inserting a second rod in the hole in said second pattern and so that said second rod is received in the pocket of said thin core;
surrounding said second pattern with a casting mold so that said casting mold carries one end of said second rod and so that upon removing said patterns said cores are held in a fixed relationship to each other and said casting mold, and said curved thin core retains its shape.

23. A method as set forth in claim 22 wherein said rod comprises quartz.

24. A method as set forth in claim 22 wherein said thin core comprises quartz.

25. A method as set forth in claim 22 wherein said thin core has a tendency to move out of position.

26. A method as set forth in claim 22 further comprising removing said patterns, casting a molten alloy in said casting mold and solidifying said alloy, and removing said rods and casting mold.

27. A method as set forth in claim 22 wherein said second pattern has a thickness less than about 0.03 inches and further comprising decreasing the alloy charge pressure over time so that the void left by said second pattern is completely filled without causing the casting mold to creep.

28. A method as set forth in claim 22 further comprising the steps of placing a second rod having a thickness ranging from about 0.009 inches to about 0.55 inches through said first removable pattern material so that when said molten alloy is solidified said second rod provides a hole through the wall corresponding to the first removable pattern material.

29. A method as set forth in claim 22 further comprising the step of decreasing the alloy charge pressure over time so that the void left by said second pattern is completely filled without causing the mold cavity to expand.

30. A process of casting a molten alloy into a substantially long mold cavity defined at least partially by a ceramic shell, so that the ceramic shell defining the mold cavity is not substantially distorted and the mold cavity is not substantially expanded during the casting process comprising
charging molten alloy into a mold reservoir which communicates with a charge line and a mold cavity defined by a ceramic shell wherein the amount of molten alloy charged into the reservoir is sufficient for the molten alloy to flow by gravity from the reservoir through the charge line and to completely fill the mold cavity;
bleeding off molten alloy at a location above the mold cavity though a bleed line having a control orifice therein so that the alloy pressure in the mold cavity is decreased over time and so that the ceramic shell is not substantially distorted and the mold cavity is not substantially expanded during the casting process; and
solidifying the molten alloy to produce a solid metal part having dimensions corresponding to the mold cavity.

* * * * *